United States Patent
Hong et al.

(10) Patent No.: US 8,155,041 B2
(45) Date of Patent: Apr. 10, 2012

(54) METHOD FOR HANDOVER BETWEEN HETEROGENEOUS NETWORKS USING LINK TRIGGER SIGNAL IN MULTI-INTERFACE MOBILE ROUTER

(75) Inventors: Hyun-Ha Hong, Seoul (KR); Ki-Seop Han, Seoul (KR); Dae-Ig Chang, Daejon (KR); Ho-Jin Lee, Daejon (KR)

(73) Assignee: Electronics and Telecomunications Research Institute, Daejon (KR)

( * ) Notice: Subject to any disclaimer, the term of this patent is extended or adjusted under 35 U.S.C. 154(b) by 828 days.

(21) Appl. No.: 12/186,670

(22) Filed: Aug. 6, 2008

(65) Prior Publication Data

US 2009/0154421 A1    Jun. 18, 2009

(30) Foreign Application Priority Data

Dec. 17, 2007    (KR) .......................... 10-2007-0132299

(51) Int. Cl.
*H04W 36/32* (2009.01)
(52) U.S. Cl. ........................... 370/311; 370/331; 455/440
(58) Field of Classification Search ........................ None
See application file for complete search history.

(56) References Cited

U.S. PATENT DOCUMENTS

| | | | |
|---|---|---|---|
| 6,625,135 B1 * | 9/2003 | Johnson et al. | 370/332 |
| 6,940,836 B2 * | 9/2005 | Borella et al. | 370/331 |
| 7,286,512 B1 * | 10/2007 | Borella | 370/338 |
| 7,991,399 B2 * | 8/2011 | Ganesan | 455/436 |
| 2004/0103204 A1 * | 5/2004 | Yegin | 709/229 |
| 2008/0233875 A1 * | 9/2008 | Desai et al. | 455/41.2 |

FOREIGN PATENT DOCUMENTS

| | | |
|---|---|---|
| KR | 102007001706 A | 2/2007 |
| KR | 2007-0061275 A | 6/2007 |

OTHER PUBLICATIONS

Park, S. Daniel et al., "L2 Triggers Optimmized Mobile IPv6 Vertical Handover: The 802.11/GPRS Example", Internet Draft (draft-daniel-mip6-optimized-vertical-handover-00.txt, Jan. 31, 2004).

* cited by examiner

*Primary Examiner* — Kwang B Yao
*Assistant Examiner* — Alex Skripnikov
(74) *Attorney, Agent, or Firm* — Rabin & Berdo, P.C.

(57) ABSTRACT

Provided is a method for handover between heterogeneous networks using a link trigger signal in a multi-interface mobile router. The method includes: maintaining a state of a second network access interface in a sleep state, activating a first network access interface, receiving and transmitting the first network service to a subordinate node in the mobile router located in a first network; when the mobile router senses a second network link-up trigger signal while moving to the second network, changing the state of the second network access interface into an active state and performing handover; and receiving a second network service through the activated second network access interface in the mobile router performing the handover and transmitting the second network service to the subordinate node.

13 Claims, 6 Drawing Sheets

METHOD FOR HANDOVER BETWEEN HETEROGENEOUS NETWORKS USING LINK TRIGGER SIGNAL IN MULTI-INTERFACE MOBILE ROUTER

CROSS-REFERENCE TO RELATED APPLICATIONS

The present invention claims priority of Korean Patent Application No. 10-2007-0132299, filed on Dec. 17, 2008, which is incorporated herein by reference.

BACKGROUND OF THE INVENTION

1. Field of the Invention

The present invention relates to a method for handover between heterogeneous networks using a link trigger signal in a multi-interface mobile router; and, more particularly, to an apparatus which can save power consumption of the mobile router, and prevent packet loss and cease of session with respect to fixed nodes included in a subordinate mobile network with no regard to a moving speed of a mobile router by performing handover between heterogeneous networks, in particular, between a terrestrial wireless network and a satellite network, using a link-up/down trigger signal in a multi-interface mobile router when a mobile network including a mobile router and the fixed node moves at high-speed.

This work was supported by the IT R&D program for MIC/IITA [2006-S-020-02, "Development of Satellite and Terrestrial Convergence Technology for Internet Service on High-speed Mobile Vehicles"].

2. Description of Related Art

According to generalization of a mobile internet service, a technology maintaining a service ceaselessly with respect to a connected session although a mobile network having a fixed node as a subordinate such as an express train as well as a mobile node moves between networks at high-speed is required.

In particular, a technology for handover between networks which can minimize packet loss and delay while using an IPv4-based mobile network in case of a high-speed mobile router moving at the speed of more than 300 Km/h such as an express train is required.

As a related art, there is a method for applying fast mobile IPv6 with respect to a mobile node while a mobile router performs handover. In this method, when the mobile router receives prefix information corresponding to a new access router after moving from an old access router before handover, and transmits the information to the mobile node, the mobile router and the mobile node request fast IPv6 binding update to the old access router.

When the old access router and the new access router exchange a handover initiate and acknowledgement message according to fast IPv6 binding and the old access router transmits a fast binding acknowledgement message to the mobile router and the mobile node, data toward the mobile router and node using the old prefix are transmitted from the old access router to the new access router through a tunnel.

When the mobile router receives the fast binding acknowledgement message and directly transmits a zero lifetime message for the old prefix release to the mobile node, the mobile node transmits data based on a new prefix.

Since the related art applies the fast mobile IPv6 described above, the mobile router can prevent packet loss in the duration of handover with respect to communication performed between the mobile node and a correspondent node (CN) and reduce a handover delay time.

However, there is a problem that since a high-speed moving object such as an express train running at a speed over 300 Km/h passes through a plurality of cells at high-speed due to a small mobile cell size, failure probability of handover increases and a minimal time required for handover between cells is not acquired to thereby cause packet loss.

SUMMARY OF THE INVENTION

The related art has a problem that packet loss is generated at a high-speed moving object such as an express train, or session may be interrupted by handover failure. An object of the present invention is to solve the above problem.

The objects of the present invention are not limited to the above-mentioned ones. Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In order to solve the above problem, the present invention performs handover between heterogeneous networks, in particular, between a terrestrial wireless network and a satellite network, using a link-up/down trigger signal in a multi-interface mobile router. Also, the present invention shifts the state of access interface for the old network into a sleep state after performing handover.

In accordance with an aspect of the present invention, there is provided a method for handover between heterogeneous networks using a link trigger signal in a multi-interface mobile router (MR), including: maintaining a state of a second network access interface in a sleep state, activating a first network access interface, receiving and transmitting the first network service to a subordinate node in the mobile router located in a first network; when the mobile router senses a second network link-up trigger signal while moving to the second network, changing the state of the second network access interface into an active state and performing handover; and receiving a second network service through the activated second network access interface in the mobile router performing the handover and transmitting the second network service to the subordinate node.

DESCRIPTION OF SPECIFIC EMBODIMENTS

The present invention provides a wireless internet service without packet loss or cease of a session with no regard to moving of a mobile router by using a new Care-of Address (CoA), which is an Internet Protocol (IP) address, temporarily used in a foreign network without change of a home address (HoA), which is an unique IP address of a subordinate fixed node (FN) and the mobile router, used in a home network when the mobile router having two interfaces capable of accessing to a wireless network and a satellite network moves from the wireless network, i.e., the home network, to the satellite network, i.e., the foreign network.

That is, the present invention relates to a method for controlling mobile network handover based on a multiple link trigger method.

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
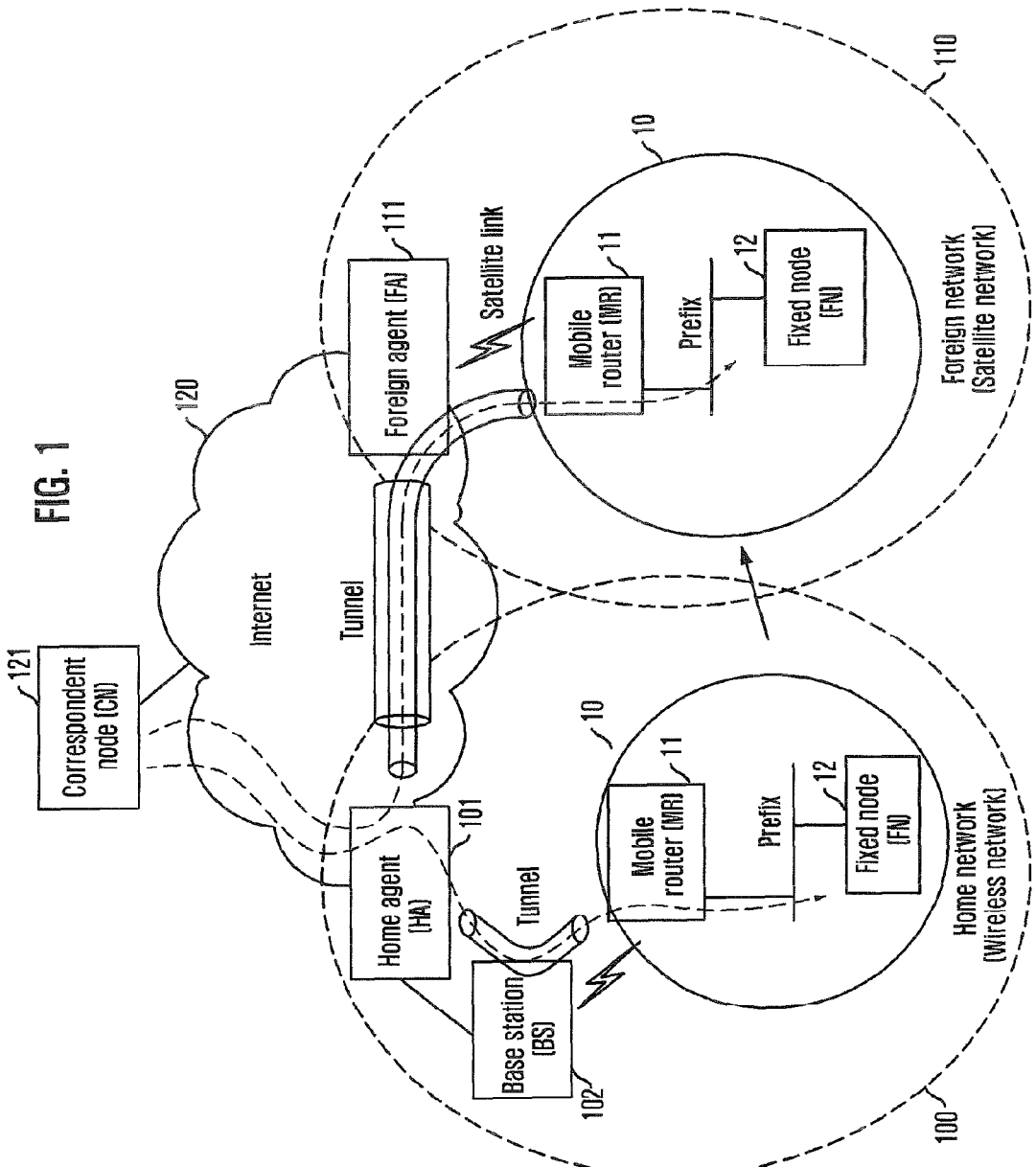
FIG. 1 is a block diagram showing a wireless/satellite cooperation network for a high-speed mobile network internet service to which the present invention is applied.

FIG. 1 is a block diagram showing a wireless/satellite cooperation network for a high-speed mobile network internet service to which the present invention is applied.

A wireless network 100 is a home network based on wireless Local Area Network (LAN) or Wireless Broadband (WiBro) technology and includes a home agent (HA) 101, a base station (BS) 102, a mobile router (MR) 11 and a subordinate fixed node (FN) 12. The wireless network 100 provides a high-speed internet service without change of IP with no regard to moving of the mobile router 11 based on a mobile network IPv4 protocol.

A satellite network 110 provides a bidirectional internet service using a forward/return link based on DVB-S2/RCS and includes a foreign agent (FA) 111, a mobile router 11 and a subordinate fixed node 12. The foreign agent 111 is located in a hub of the satellite network 110, and operated as a foreign network access router for the mobile router 11. The foreign agent 111 and the mobile router 11 are connected by a bidirectional link through a satellite.

A correspondent node (CN) 121 is a mobile or static node for exchanging data with the mobile router 11 on mobile network IPv4 internet protocol.

When the mobile router 11 of the home network 100 moves to the satellite network 110, which is a foreign network, the fixed node 12 and the mobile router 11 continue an internet service with the correspondent node 121 without change of the fixed IP address HoA with no regard to moving of the mobile router 11 by obtaining a new IP address CoA based on the mobile network IPv4 protocol and forming a new tunnel between the home agent 101 and the foreign agent 111.

In a wireless/satellite network handover scenario, although a train leaves an express train station and an IP domain is changed after a passenger rides on the train at the express train station and connects to an internet 120 through the mobile router 11 and the base station 102, the fixed node 12 and the mobile router 11 in the train makes a new access to an access router, i.e., the foreign agent 111, and maintains an internet service with the correspondent node 121 through the satellite link.

A case that the train enters a station of an intermediate area and enters a dead zone where the internet service is not provided through a satellite link corresponds to the scenario that the entire mobile network 10 including the mobile router 11 and the subordinate fixed node 12 returns to the home network in FIG. 1. At this time, a tunnel of the home agent 101 and the foreign agent 111 of the satellite network is released and the fixed node 12 performs internet communication with the correspondent node 121 through a tunnel between the mobile router 11 and the home agent 101 without change of the original fixed IP address HoA.

Subsequently, when the train leaves the station and becomes accessible to the satellite network 110, data transmission between the fixed node 12 and the correspondent node 121 is continued through the mobile network handover procedure described above.

Figure 2:
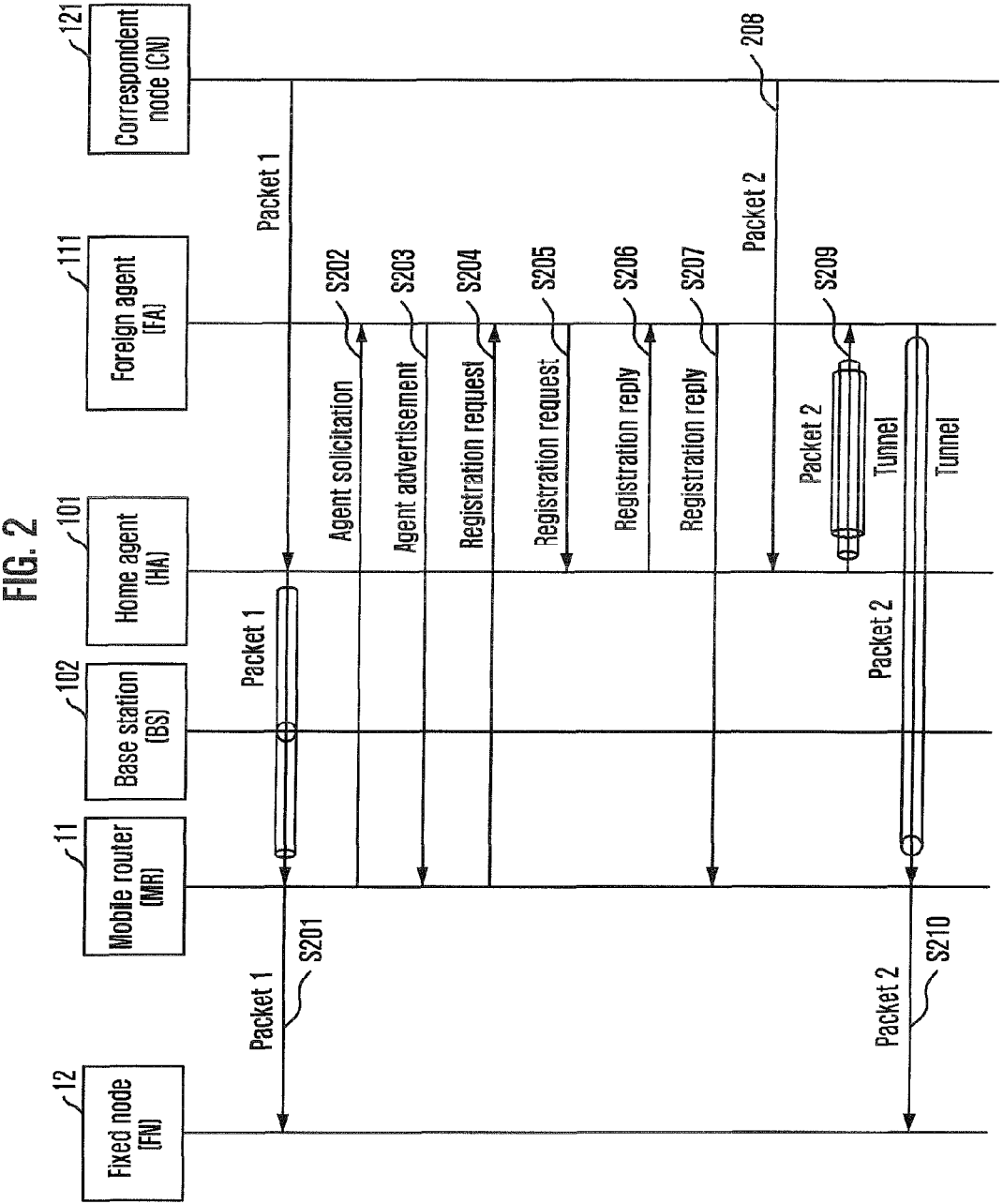
FIG. 2 is a flowchart describing a handover processing method when the mobile router applied to the present invention moves to the foreign network.

FIG. 2 is a flowchart describing a handover processing method when the mobile router applied to the present invention moves to the foreign network and shows a mobile network IPv4 handover process applied when the mobile router moves from the home network to the foreign network.

At step S201, the mobile router 11 forms a tunnel between the base station 102 and the home agent 101 in the home network 100, which is the wireless network, and the fixed node 12 receives packet1 data from the correspondent node 121 at a receiving address of own fixed home IP address HoA.

When the train leaves the station, the mobile router 11 forms a link through the foreign agent 111 and an access procedure of a layer 1/2 with respect to a newly accessed satellite network 110 and an IP/Mobile IP layer (MIP) will be performed.

That is, at step S202, the mobile router 11 transmits an agent solicitation message to the foreign agent 111, which is an MIP layer signal, to perform fast handover.

At step S203, the foreign agent 111 receives the agent solicitation message and transmits an agent advertisement message having CoA information, which is an IP address to be temporarily used by the mobile router 11 in the foreign network, to the mobile router 11.

At steps S204 and S205, the mobile router 11 transmits a registration request message to the home agent 101 through the foreign agent 111. As a reply, the home agent 101 transmits a registration reply message to the mobile router 11 in a reverse order at steps S206 and S207.

After going through the registration request and reply procedures of the steps S204 to S207, a new tunnel is formed between the home agent 101 and the foreign agent 111 and packet2 data transmission is performed between the correspondent node 121 and the fixed node 12 through the tunnel at steps S208 to S210.

That is, when the mobile router 11 is at the home network 100, the packet transmitted from the correspondent node 121 is transmitted to the mobile router 11 and the fixed node 12 is based on the fixed IP address HoA through the home agent 101 and the base station 102. However, after the fixed node 12 and the mobile router 11 move to the foreign network 110, the packet transmitted from the correspondent node 121 through the tunnel using a new temporary IP address CoA for the mobile router 11 is routed. Accordingly, although a domain is changed, the change of the home IP address HoA of the fixed node 12 and the mobile router 11 is unnecessary.

As described above, when handover occurs between domains in the mobile network, the packet loss transmitted from the correspondent node 121 occurs in the duration of performing the procedures of mobile detection, agent discovery, and registration for the foreign network. Accordingly, a fast handover procedure including methods such as pre/post registration, regional registration, and fast mobile IP is required.

Figure 3:
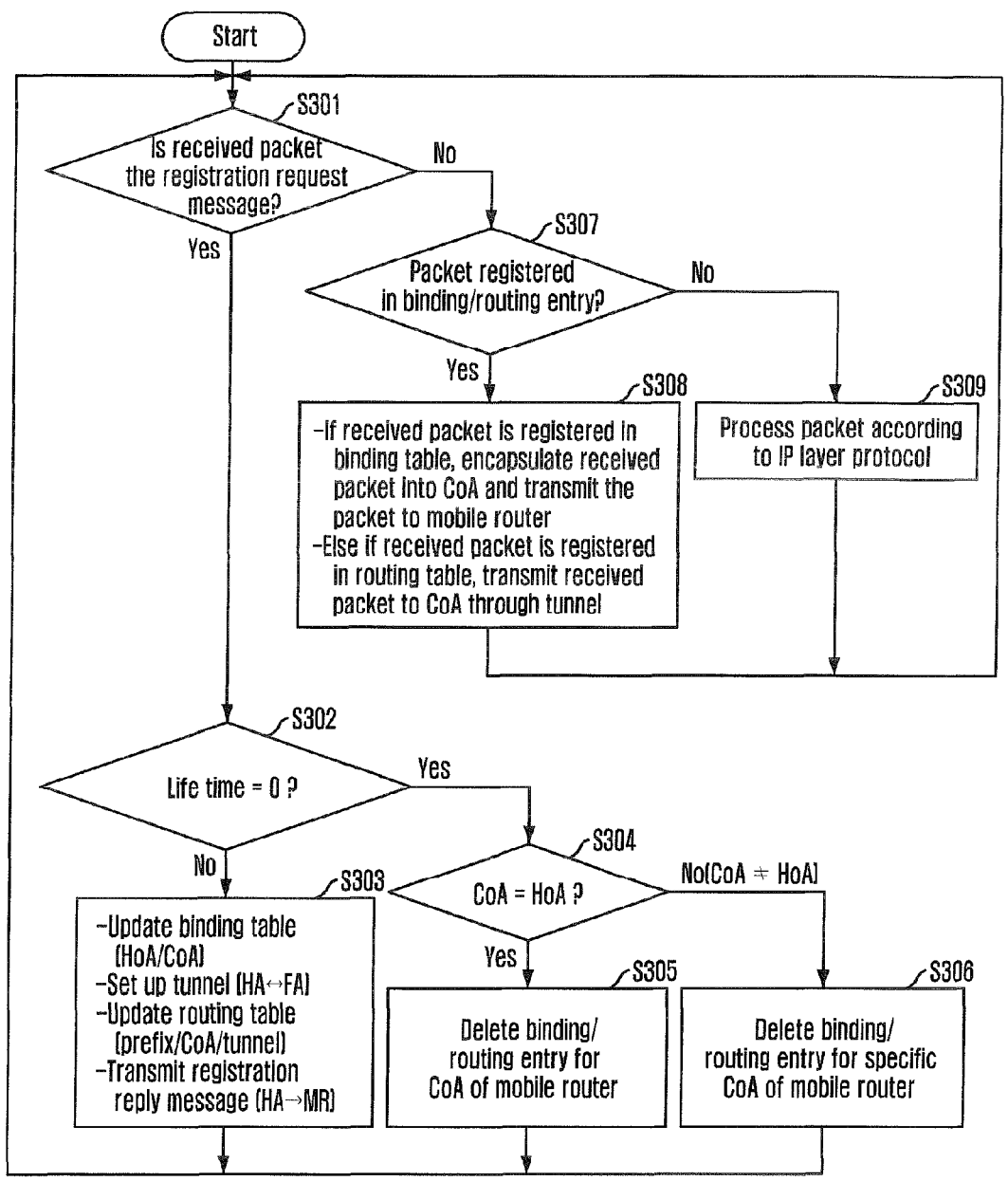
FIG. 3 is a flowchart describing a handover operation of a home agent in a wireless/satellite cooperation network applied to the present invention.

FIG. 3 is a flowchart describing a handover operation of a home agent in a wireless/satellite cooperation network applied to the present invention and shows a mobile network IPv4 operation for the home agent 101 among wireless/satellite network handover processes.

When the mobile router 11 moves to the foreign network 110, the home agent 101 receives a registration request message from the mobile router 11 at steps S204 and S205 as described in FIG. 2

When the home agent 101 receives a packet from the network, it is checked at step S301 whether the received packet is a registration request message. When it turns out that the received packet is the registration request message, it is checked at step S302 that life time=0. When the received packet is not the registration request message, i.e., when the received packet is a data packet, the procedures of steps S307 to S309 are performed and it will be described hereinafter.

When it turns out at step S302 that the life time of the received registration request message is not "0", i.e., life time≠0, procedures of registering/updating HoA and CoA for the mobile router 11 in a binding table, setting up a tunnel between the mobile router 11 and the foreign agent 111, registering/updating a prefix/CoA/tunnel of a routing table, transmitting a registration reply message to the mobile router 11 at step S303 and going back to a next packet reception waiting state are performed.

When it turns out at step S302 that the life time of the received registration request message is "0", i.e., life time=0, two operations are performed according to whether the CoA address is the same as the HoA address. When the CoA address is the same as the HoA address, a binding/routing entry for CoA registered with respect to the mobile router 11 is deleted at steps S304 and S305 since the registration request message is transmitted after the mobile router 11 returns to the home network 100. When the CoA address is not the same as the HoA address, only the entry for the transmitted CoA address is deleted in the binding/routing table at steps S304 and S306.

When it turns out at step S301 that the received packet is not the registration request message, it is checked at step S307 whether the received packet is registered in the binding/routing entry since the data packet is transmitted from the correspondent node 121.

When it turns out at the check that the received packet is registered in the binding/routing entry, it is checked whether the receiving IP address is the same as HoA. When the received packet is registered in the binding table, the received packet is encapsulated into the CoA and transmitted to the mobile router 11. When the received packet is registered in the routing table, the received packet is transmitted to the mobile router 11 via the foreign agent 111 through the tunnel at step S308. When the received packet is not registered in the binding/routing table, the received packet is processed according to conventional IP layer protocol at step S309.

In the wireless/satellite network handover process to which the present invention is applied, the mobile network IPv4 operation for the foreign agent 111 is the same as the basic function of the general router. Also, only a function of performing decapsulation on the packet received through the tunnel by managing a visitor list for the mobile router 11 and transmitting the packet to the mobile router 11 is required. Accordingly, detailed description will not be provided here.

Figure 4:
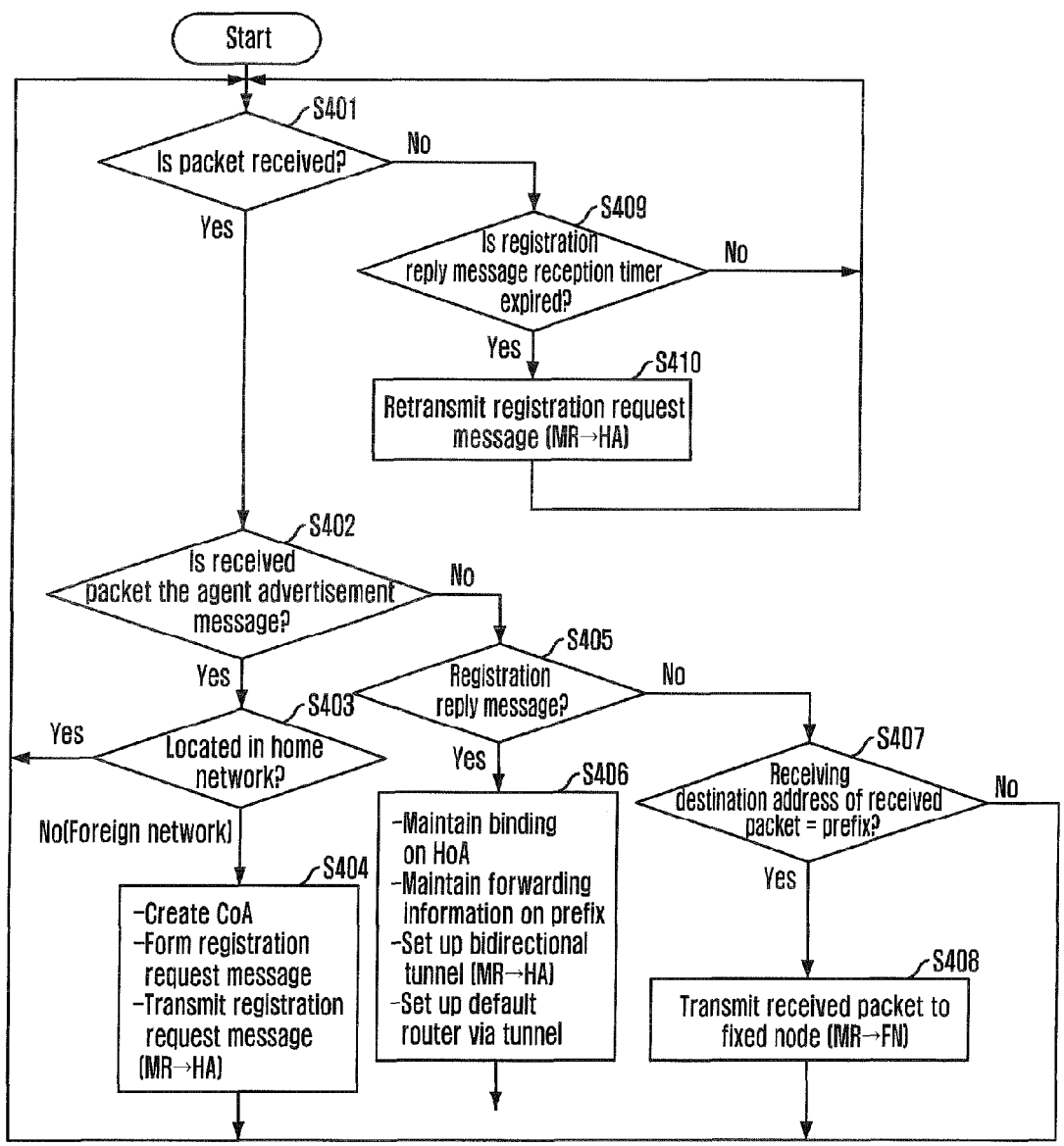
FIG. 4 is a flowchart describing a handover operation of a mobile router in the wireless/satellite cooperation network to which the present invention is applied.

FIG. 4 is a flowchart describing a handover operation of a mobile router in the wireless/satellite cooperation network to which the present invention is applied and shows a mobile network IPv4 operation for the mobile router 11 among the wireless/satellite network mobile router handover processes.

When the mobile router 11 enters the foreign network 110, the mobile router 11 may transmit an agent solicitation message to the foreign agent 111 as an option for reducing a handover time but basically receive an agent advertisement message from the foreign agent 111.

When the mobile router 11 receives a packet at step S401, it is checked at step S402 whether the received packet is the agent advertisement message. When the received packet is the agent advertisement message, it is determined at step S403 whether the current entrance network is the home network 100 or the foreign network 110. At the determination result, when the mobile router 11 enters the home network 100, the mobile router 11 goes back to the packet reception waiting state. When it is determined that the mobile router 11 enters the foreign network, the mobile router 11 creates a temporary IP address CoA, and forms and transmits a registration request message to the home agent 101 via the foreign agent 111 at step S404.

When the packet received in the mobile router 11 is the registration reply message transmitted from the home agent 101 as the reply for the registration request message at steps S401, S402, and S405, the mobile router 11 performs to maintain the binding on the fixed IP address HoA, to maintain the forwarding information on the prefix, to form tunnel between the mobile router 11 and the home agent 101, to set up the foreign agent 111 as a default router of the mobile router 11, and goes back to a next packet reception waiting state at step S406.

When the packet received in the mobile router 11 is neither the agent advertisement message nor the registration reply message at steps S401, S402, and S405, and the destination address of the received packet is the same as the prefix at step S407, the mobile router 11 transmits the received packet to the fixed node 12 at step S408 since the received packet is the packet transmitted from the correspondent node 121 to the fixed node 12.

When the mobile router 11 does not receive the registration reply message from the home agent 101 after transmitting the registration request message at steps S401 and S409, the mobile router 11 retransmits the registration request message to the home agent 101 at step S410.

Figure 5:
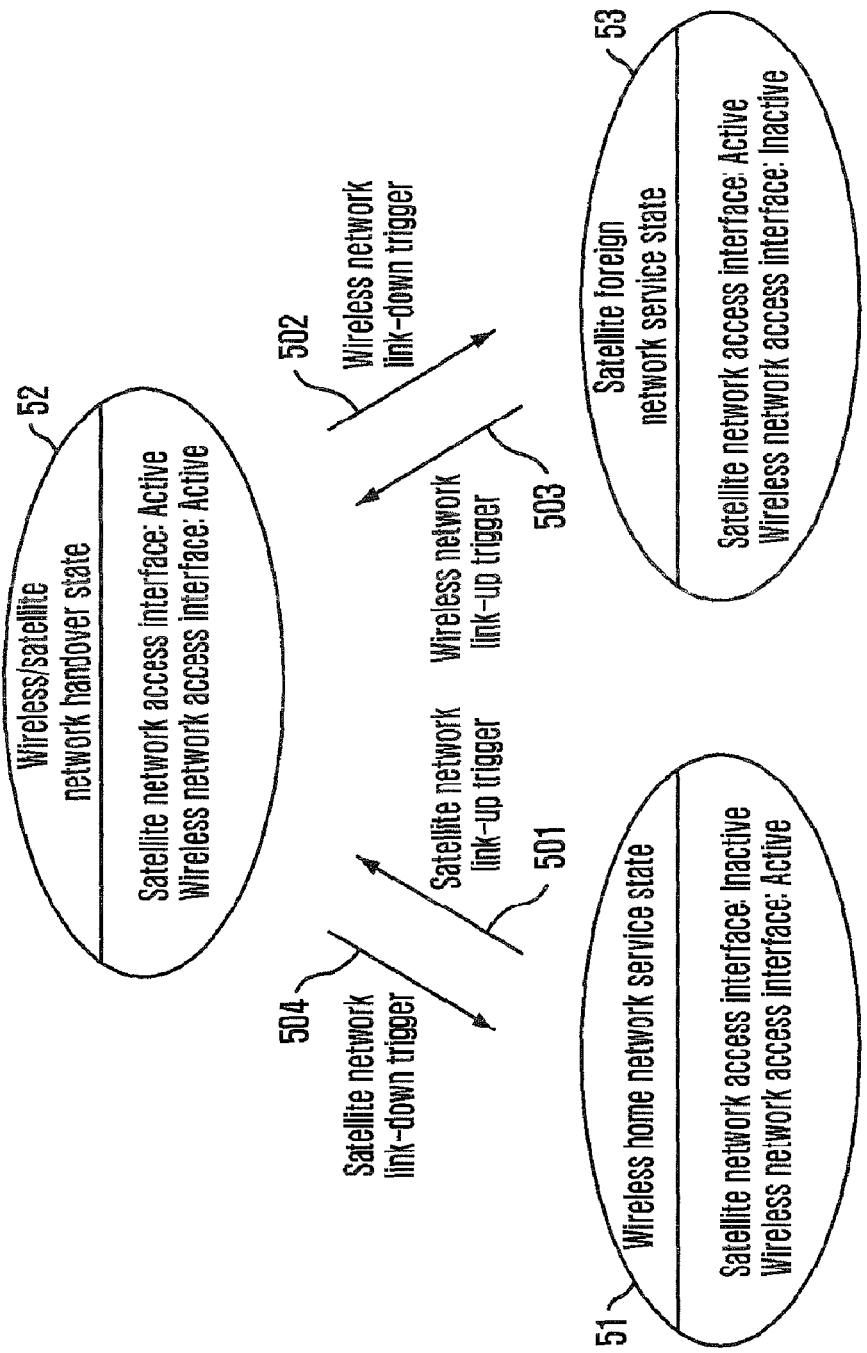
FIG. 5 shows state diagram of the mobile router using a sequential link trigger signal of multi-interface in accordance with an embodiment of the present invention.

FIG. 5 shows state diagram of the mobile router using a sequential link trigger signal of multi-interface in accordance with an embodiment of the present invention.

The operation state of the mobile router 11 having multi-interface is performed by being divided into two service states 51 and 53 by the wireless network 100 and the satellite network 110, and a handover state 52 for wireless/satellite network duplicated section. The satellite network 110 designates a region including an entire driving route of the express train as a satellite network cell.

In the wireless home network service state 51, while the mobile router 11 having two network access interfaces is located in the terrestrial wireless network 100, which is a home network, the mobile router 11 accesses to the base station 102 through one wireless network access interface and performs IP communication with the correspondent node 121 through the home agent 101. Since an internet service through a satellite network is not provided in this state, the satellite network access interface maintains a sleep state.

When the mobile router 11 enters the satellite network 110, a satellite network link-up trigger signal 501 is notified to a mobile IP layer by the layer 1/2 process of the satellite network access interface in the sleep state and the mobile router 11 is shifted to the wireless/satellite network handover state 52 by the signal. In the wireless/satellite network handover state 52, the mobile router 11 receives a packet through the wireless network access interface and the satellite network access interface by performing the handover procedure of FIG. 2 with the foreign agent 111 and the home agent 101 through the satellite network access interface. Accordingly, packet loss by the mobile network handover does not occur.

Subsequently, when the mobile router 11 does not receive a radio signal from the wireless network 100, the wireless network link-down trigger signal is generated by the layer 1/2 process. According to the signal, the mobile router 11 changes the state of the wireless network access interface into the sleep state and is shifted into the satellite foreign network service state 53.

In the satellite foreign network service state 53, the mobile router 11 communicates with the correspondent node 121 through the tunnel between the foreign agent 111 and the home agent 101 through the satellite network access interface and the wireless network access interface maintains the sleep state. Accordingly, it is possible to save power consumption of the mobile router 11.

Subsequently, when the mobile router 11 returns to the wireless home network 100, a wireless network link-up trigger signal 503 is notified to the mobile IP layer by the layer 1/2 process of the wireless network access interface in the sleep state. According to the signal, the mobile router 11 is shifted again into the wireless/satellite network handover state 52.

In the wireless/satellite network handover state 52, the mobile router 11 performs the handover procedure of the registration release as shown in FIGS. 2 and 3 with the base station 102 and the home agent 101 through the wireless network access interface. Accordingly, since the mobile router 11 can receive data through two network access interfaces while moving in the wireless/satellite network duplicated section, it is possible to continue communication with the correspondent node 121 without packet loss.

Subsequently, when the mobile router 11 does not receive the satellite signal from the satellite network 110, a satellite network link-down trigger signal 504 is generated by the layer 1/2 process of the satellite network access interface. According to the signal, the mobile router 11 changes the state of the satellite network access interface into the sleep state and is shifted into the wireless home network service state 51.

The packet loss can be prevented with no regard to the moving speed of the mobile router by controlling the mobile network handover by the sequential multiple link-up/down trigger signals. Also, the power consumption of the mobile router can be reduced by changing the state of the inactive network access interface into the sleep state in other two service states 51 and 53 excluding the wireless/satellite network handover state 52.

Figure 6:
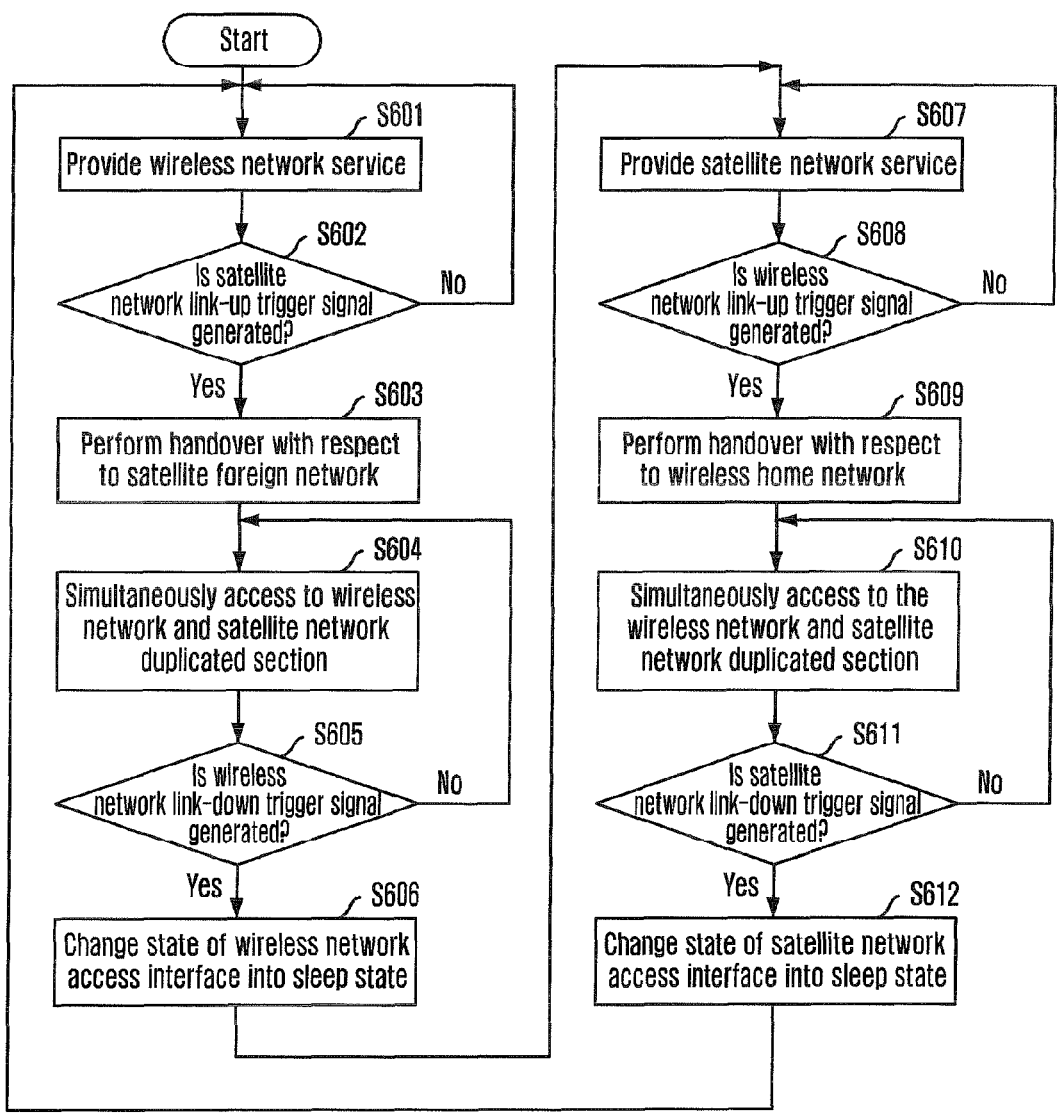
FIG. 6 is a flowchart describing a handover control method of the mobile router using a sequential link trigger signal of multi-interface in accordance with an embodiment of the present invention.

FIG. 6 is a flowchart describing a handover control method of the mobile router using a sequential link trigger signal of multi-interface in accordance with an embodiment of the present invention.

When the mobile router 11 having two network access interfaces is located at the terrestrial wireless network at the initial stage, the mobile router 11 accesses to the base station 102 through one wireless network access interface and performs IP communication with the correspondent node 121 through the home agent 101 at step S601. Since other satellite network access interface is not used, the mobile router 11 maintains the sleep state and continuously checks at step S602 whether a satellite network link-up trigger signal is generated.

The satellite network link-up trigger signal is generated by the layer 1/2 process of the satellite network access interface in the sleep state. To be specific, when it is determined whether values of a beacon signal, radio signal strength, and a S/N ratio are higher than threshold, or through a procedure that pre-stored information is compared with GPS location information of the mobile router 11, the satellite network link-up trigger signal is generated.

When it turns out at the step S602 that the satellite network link-up trigger signal is generated, the mobile router 11 performs a handover procedure according to a mobile IP (MIP) registration procedure of FIG. 2 with the foreign agent 111 and the home agent 101 through the satellite network access interface with respect to the satellite foreign network at step S603. At step S604, the mobile router 11 receives and processes packets transmitted through both the wireless network access interface and the satellite network access interface. For example, when the mobile router 11 receives 10 packets from a correspondent node, the mobile router 11 receives 5 packets through the wireless network access interface before handover and receives rest 5 packets through the satellite network access interface after handover.

Since the mobile router 11 maintains the same state before a wireless network link-down trigger signal 502 is generated, packet loss does not occur in data transmission between the fixed node 12 and the correspondent node 121 while the mobile router 11 moves to the wireless network and satellite network duplicated section.

The wireless network link-down trigger signal is generated by the layer 1/2 process of the wireless network access interface. To be specific, values of beacon signal loss, radio signal strength, an S/N ratio, and a data transmission change rate is lower than threshold, it is determined that the wireless network link goes down and a wireless network link-down trigger signal is generated.

When the wireless network link-down trigger signal is generated at step S605, the mobile router 11 changes the state of the wireless network access interface into a sleep state at step S606, and performs packet transmission with the correspondent node 121 by the satellite network access interface continuously at step S607 via the tunnel created at step S603 between the foreign agent 111 and the home agent 101 until the wireless network link-up trigger signal is generated. Accordingly, it is possible to save power consumption of the mobile router 11.

When the mobile router 11 moves to the wireless home network, a wireless network link-up trigger signal is generated by the layer 1/2 process of the wireless network access interface in the sleep state. To be specific, when it is determined whether values of a beacon signal, radio signal strength, and a S/N ratio are higher than threshold, or through a procedure that pre-stored information is compared with GPS location information, the wireless network link-up trigger signal is generated.

When the wireless network link-up trigger signal is generated at step S608, the mobile router 11 performs the handover procedure of the registration release according to FIGS. 2 and 3 with the base station 102 and the home agent 101 through the wireless network access interface with respect to the wireless home network at step S609, and receives packets transmitted through both the wireless network access interface and the satellite network access interface at step S610. Since the mobile router 11 maintains the same state until the satellite network link-down trigger signal is generated, the fixed node 12 can continuously communicate with the correspondent node 121 without packet loss while the mobile router 11 moves to the wireless network and satellite network duplicated section.

The satellite network link-down trigger signal is generated by the layer 1/2 process of the satellite network access interface. When values of beacon signal loss, radio signal strength, S/N ratio, and a data transmission change rate is lower than threshold, it is determined that the satellite network link goes down and a satellite network link-down trigger signal is generated.

When the satellite network link-down trigger signal is generated at step S611, the mobile router 11 changes the state of the satellite network access interface into a sleep state at step S612, and transmits the packet to the wireless network access interface through the base station 102 and the home agent 101 where the handover procedure of the registration release is performed at step S609. Accordingly, the fixed node 12 and the correspondent node 121 go back to the initial wireless home network service providing state of continuously performing IP communication without loss.

It is possible to prevent packet loss with no regard to the moving speed of the mobile router 11 by performing mobile network handover control between networks using the sequential link-up/down trigger signal for multiple network access interface, and save power consumption of the mobile router by changing the inactive network access interface into the sleep state in both the wireless network and satellite network service providing state.

As described above, the technology of the present invention can be realized as a program. A code and a code segment forming the program can be easily inferred from a computer programmer of the related field. Also, the realized program is stored in a computer-readable recording medium, i.e., information storing media, and is read and operated by the computer, thereby realizing the method of the present invention. The recording medium includes all types of recording media which can be read by the computer.

As described above, the present invention can prevent packet loss and session cease with no regard to the moving speed of the mobile router at the express train by controlling mobile network handover between a wireless network and a satellite network by the sequential link-up/down trigger signal in the mobile router having multi-interface.

That is, the present invention can provide a wireless internet service to the fixed node located in the subordinate of the mobile router at the express train without packet loss or session cease by performing handover from the wireless network of the small cell size to the satellite network of the large cell size based on link trigger.

Also, the present invention can reduce power of the mobile router by shifting the state of another inactive access interface into the sleep state in both the wireless network and satellite network service providing state excluding the handover section in case where the mobile router installs a dual interface and performs handover between the wireless home network and the satellite foreign network at high-speed.

That is, considering that it takes long time to return to wireless home network by moving from the satellite foreign network of the large cell size to the wireless network section, the present invention can prevent packet loss due to frequent handover operation and remarkably save power consumption of the mobile router by controlling the state of the wireless network access interface, which is not used while providing a service in the satellite network section.

While the present invention has been described with respect to the specific embodiments, it will be apparent to those skilled in the art that various changes and modifications may be made without departing from the spirit and scope of the invention as defined in the following claims.

What is claimed is:

1. A method for a handover between heterogeneous networks including a first network and a second network, using a link trigger signal in a multi-interface mobile router having a first network access interface for accessing the first network and a second network access interface for accessing the second network, the method comprising:
   generating by the second network access interface a second network link-up trigger signal when the mobile router enters the second network;
   while the mobile router is located in the first network, maintaining by the mobile router a state of the second network access interface in a sleep state, activating the first network access interface, receiving a first network service through the activated first network access interface, and transmitting the first network service to a subordinate node;
   when the mobile router senses the generated second network link-up trigger signal while moving to the second network, changing the state of the second network access interface into an active state and performing by the mobile router the handover to the second network; and
   after performing the handover to the second network, receiving by the mobile router a second network service through the activated second network access interface in the mobile router and transmitting the second network service to the subordinate node, wherein the second network link-up trigger signal is generated by a layer 1/2 process of the second network access interface, and wherein the generated second network link-up trigger signal is notified to a mobile IP layer of the mobile router.

2. The method of claim 1, further comprising:
   generating by the first network access interface a first network link-down trigger signal when the first network access interface does not receive a signal from the first network; and
   when the mobile router performing the handover, senses the generated first network link-down trigger signal while moving and entering the second network, changing a state of the first network access interface into the sleep state.

3. The method of claim 2, wherein the first network link-down trigger signal is generated by evaluating any one of a beacon signal, a radio signal strength, S/N ratio, and a data transmission change rate for the first network access interface in the active state.

4. The method of claim 2, wherein the first network link-down trigger signal is generated by a layer 1/2 process of the first network access interface.

5. The method of claim 4, wherein the generated first network link-up trigger signal is notified to a mobile IP layer of the mobile router.

6. The method of claim 1, wherein
   the first network is a wireless network as a home network,
   the second network is a satellite network as a foreign network,
   the first network access interface is a wireless network access interface, and
   the second network access interface is a satellite network access interface.

7. The method of claim 6, wherein the mobile router accesses to a base station of the wireless network through the wireless network access interface, and performs, based on a unique IP address as a home address of the mobile router, Internet Protocol (IP) communication with a correspondent node through a home agent.

8. The method of claim 7, further comprising generating by the satellite network access interface a satellite network link-up trigger signal when the mobile router enters the satellite network, wherein when the generated satellite network link-up trigger signal is sensed, the mobile router performs the handover according to a mobile IP registration procedure for registering with a foreign agent and the home agent through the satellite network access interface, and maintains the IP communication with the correspondent node based on a temporary IP address as a Care-of-Address of the mobile router.

9. The method of claim 8, further comprising generating by the wireless network access interface a wireless network link-down trigger signal when the wireless network access interface does not receive a signal from the wireless network,
wherein when the mobile router senses the generated wireless network link-down trigger signal, the IP communication with the correspondent node is maintained through a tunnel between the foreign agent and the home agent through the satellite network access interface.

10. The method of claim 1, wherein
the first network is a satellite network as a foreign network,
the second network is a wireless network as a home network,
the first network access interface is a satellite network access interface, and
the second network access interface is a wireless network access interface.

11. The method of claim 10, further comprising generating by the wireless network access interface a wireless network link-up trigger signal when the mobile router enters the wireless network,
wherein when the mobile router senses the generated wireless network link-up trigger signal while moving to the wireless network, a mobile IP registration release procedure is performed to release an IP registration from a base station and a home agent through the wireless network access interface.

12. The method of claim 11, further comprising generating by the satellite network access interface a satellite network link-down trigger signal when the satellite network access interface does not receive a signal from the satellite network,
wherein after the mobile IP registration release procedure is performed through the wireless network access interface, the mobile router, when sensing the generated satellite network link-down trigger signal, performs IP communication with a correspondent node through the base station and the home agent.

13. The method of claim 1, wherein the second network link-up trigger signal is generated by evaluating any one of a beacon signal, radio signal strength, a signal-to-noise ratio (S/N) for the second network access interface in the sleep state, and GPS location information of the mobile router.

* * * * *